United States Patent
Schuh et al.

(10) Patent No.: US 12,148,989 B2
(45) Date of Patent: Nov. 19, 2024

(54) AERIAL VEHICLE AND CONTROL THEREOF

(71) Applicant: Telefonaktiebolaget LM Ericsson (publ), Stockholm (SE)

(72) Inventors: Ralf Schuh, Lund (SE); Sathya Narayana Venkatasubramanian, Upplands Väsby (SE); Thomas Chapman, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 129 days.

(21) Appl. No.: 17/918,483

(22) PCT Filed: Apr. 17, 2020

(86) PCT No.: PCT/EP2020/060852
§ 371 (c)(1),
(2) Date: Oct. 12, 2022

(87) PCT Pub. No.: WO2021/209153
PCT Pub. Date: Oct. 21, 2021

(65) Prior Publication Data
US 2023/0145081 A1 May 11, 2023

(51) Int. Cl.
*B64U 20/80* (2023.01)
*H01Q 1/28* (2006.01)
(Continued)

(52) U.S. Cl.
CPC ............ *H01Q 1/526* (2013.01); *B64U 20/80* (2023.01); *H01Q 1/28* (2013.01); *H04B 7/18504* (2013.01); *B64U 30/20* (2023.01); *B64U 50/19* (2023.01); *B64U 60/50* (2023.01); *B64U 2201/00* (2023.01); *B64U 2201/10* (2023.01)

(58) Field of Classification Search
CPC .......... H01Q 1/28; H01Q 1/52; B64C 39/024; B64U 2201/00; B64U 2201/10; B64U 2201/20
See application file for complete search history.

(56) References Cited

U.S. PATENT DOCUMENTS 10,189,562 B2 * 1/2019 Wang ..................... B64U 10/14
11,453,513 B2 * 9/2022 Thompson ............. G06V 20/13
(Continued)

FOREIGN PATENT DOCUMENTS

WO 2020119910 A1 6/2020

OTHER PUBLICATIONS

International Search Report and Written Opinion dated Jan. 12, 2021 for International Application No. PCT/EP2020/060852 filed Apr. 17, 2020; consisting of 8 pages.

*Primary Examiner* — Hasan Islam
(74) *Attorney, Agent, or Firm* — Weisberg I.P. Law, P.A.

(57) ABSTRACT

An aerial vehicle includes a radio transceiver device configured for radio transmission in a set of radiation directions. The aerial vehicle includes a mechanical shield positioned to reduce power of the radio transmission in at least some of the radiation directions in the set of radiation directions. The aerial vehicle further includes a controller configured to control at least one of: movement of the aerial vehicle, movement of the mechanical shield, radio communication of the aerial vehicle via the radio transceiver device.

19 Claims, 4 Drawing Sheets

(51) Int. Cl.
*H01Q 1/52* (2006.01)
*H04B 7/185* (2006.01)
*B64U 30/20* (2023.01)
*B64U 50/19* (2023.01)
*B64U 60/50* (2023.01)

(56) References Cited

U.S. PATENT DOCUMENTS

2016/0330771 A1 11/2016 Tan
2018/0294871 A1 10/2018 Kosseifi et al.
2018/0375568 A1 12/2018 De Rosa et al.

* cited by examiner

AERIAL VEHICLE AND CONTROL THEREOF

CROSS-REFERENCE TO RELATED APPLICATION

This application is a Submission Under 35 U.S.C. § 371 for U.S. National Stage Patent Application of International Application Number: PCT/EP2020/060852, filed Apr. 17, 2020 entitled "AERIAL VEHICLE AND CONTROL THEREOF," the entirety of which is incorporated herein by reference.

TECHNICAL FIELD

Embodiments presented herein relate to an aerial vehicle, a method, a controller, a computer program, and a computer program product for controlling the aerial vehicle.

BACKGROUND

Unmanned aerial vehicles (UAVs), also known as drones, are becoming more and more popular in daily life for private or professional applications. UAVs might utilize cellular mobile networks by acting as user equipment (UE) for control or relaying of data (such as video), or even serving as flying radio base stations serving UEs on the ground. Existing frequency bands as traditionally utilized for radio communication in cellular mobile networks might be reused to guide or operate UAVs and carry payload information to the UAVs. UAVs might be considered as operating at comparatively low altitudes, such as no more than 300 m from ground. For operating UAVs within cellular mobile networks, the frequency bands below 1.8 GHZ, or even below 1 GHZ, are of particular interest due to their potentially large coverage range.

In order to operate UAVs within cellular mobile networks, some issues must be resolved. One issue relates interference and/or blocking caused by UAVs towards other services that operate in nearby frequencies or frequency bands. Interference on other frequencies typically arises due to harmonics or intermodulation products (e.g. second order harmonic or possible intermodulation distortion (IMD)) due to transmitter non-linearities in the radio transceiver devices of the UAVs. Apart from interference, another issue is that services operating in nearby frequencies or frequency bands may be susceptible to transmission power in the frequency band used by the UAVs due to imperfect selectivity of the receivers used by these services. In turn, this might result in blocking. Further, UAVs might, due to not being based on the ground, have line of sight (LOS) conditions both to the communications device they are communicating with (e.g. a UE or a radio base station) as well as to radio receivers belonging to other services.

So-called coordination zones might be used in order to protect other ground services (e.g. radar stations, radio astronomy services, etc.). Within co-ordination zones, transmissions within certain frequency bands are forbidden in order to avoid the risk of interference and/or blocking towards the receivers of such ground services. Co-ordination zones are placed around these ground service receivers. Such coordination zones can be from a few kilometers wide in the case of a radar station and up to 100 km wide in the case of radio astronomy service (RAS) earth receiver stations. For UAVs such coordination zones may be a no-fly zone (exclusion zone). Alternatively, the UAVs might have additional and more stringent restrictions on transmit power and/or spurious emissions within the co-ordination zone, or a combination of no-fly zones and restricted limits. However, despite these measures, there is still a risk that the UAVs continue to cause interfere and/or blocking to other ground services.

Hence, there is still a need for an improved radio emission control of UAVs and other types of aerial vehicles.

SUMMARY

An object of embodiments herein is to provide efficient radio emission control of an aerial vehicle as well as an aerial vehicle that implements such efficient radio emission control.

According to a first aspect there is presented an aerial vehicle. The aerial vehicle comprises a radio transceiver device configured for radio transmission in a set of radiation directions. The aerial vehicle comprises a mechanical shield positioned to reduce power of the radio transmission in at least some of the radiation directions in the set of radiation directions. The aerial vehicle comprises a controller configured to control at least one of: movement of the aerial vehicle, movement of the mechanical shield, radio communication of the aerial vehicle via the radio transceiver device.

According to a second aspect there is presented a method for controlling an aerial vehicle according to the first aspect. The method comprises controlling, using the controller, at least one of: movement of the aerial vehicle, movement of the mechanical shield, radio communication of the aerial vehicle via the radio transceiver device.

According to a third aspect there is presented a controller for controlling an aerial vehicle according to the first aspect. The controller comprises processing circuitry. The processing circuitry is configured to cause the controller to control at least one of: movement of the aerial vehicle, movement of the mechanical shield, radio communication of the aerial vehicle via the radio transceiver device.

According to a fourth aspect there is presented a controller for controlling an aerial vehicle according to the first aspect. The controller comprises a control module configured to control at least one of: movement of the aerial vehicle, movement of the mechanical shield, radio communication of the aerial vehicle via the radio transceiver device.

According to a fifth aspect there is presented a computer program for controlling an aerial vehicle according to the first aspect, the computer program comprising computer program code which, when run on a controller, causes the controller to perform a method according to the second aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously these aspects provide efficient radio emission control of the aerial vehicle.

Advantageously these aspects enable operation of the aerial vehicle within restricted zones, such as within co-ordination zones.

Advantageously, the mechanical shield is simple yet efficient to limit radiation from the radio transceiver device in defined direction(s), without explicit radiation, or emission, control of the radio transceiver device.

Advantageously, the mechanical shield is simple yet efficient to limit radiation from the radio transceiver device in defined direction(s), for example as a function of height and distance between the unmanned aerial vehicle and a victim radio transceiver device.

Advantageously these aspects are applicable for aerial vehicles acting as user equipment as well as radio access network nodes.

Advantageously these aspects are not limited to any particular frequency bands.

Advantageously these aspects are readily combined with existing mechanisms for radiation, or emission, limitations.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
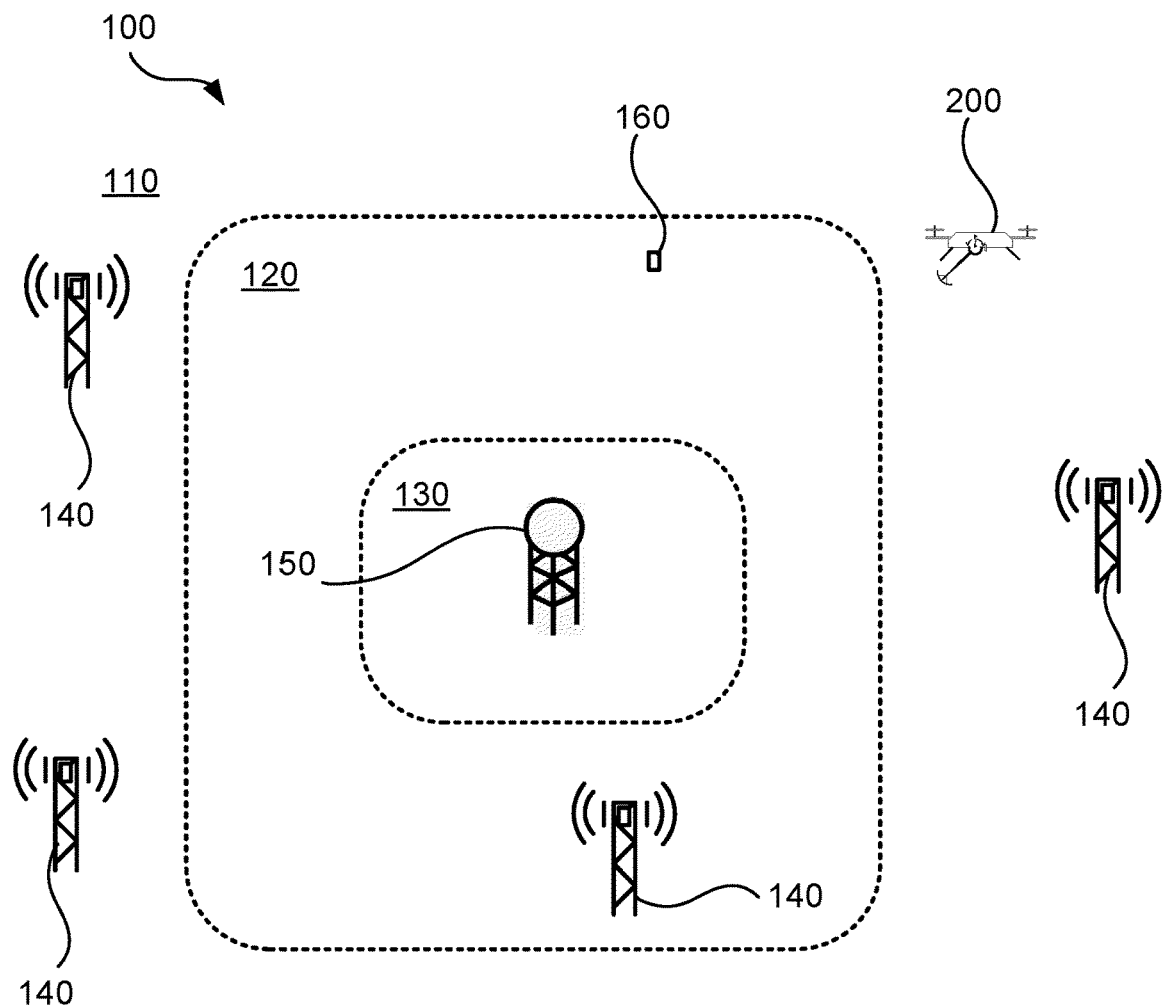
FIG. 1 is a schematic diagram illustrating a communication network according to embodiments.

FIG. 1 is a schematic diagram illustrating a communication network 100 where embodiments presented herein can be applied.

The communication network 100 comprises network access points 140 and a victim radio transceiver device 150. Non-limiting examples of network access points 140 are radio access network nodes, radio base stations, base transceiver stations, node Bs, evolved node Bs, gNBs, access points, backhaul nodes, integrated access and backhaul nodes, repeater nodes, etc. The network access points 140 might thus define a cellular network. Non-limiting examples of victim radio transceiver devices 150 are radar stations, radio astronomy services, etc. A user equipment 160 is provided network access, and thus served, by at least one of the network access points 140 or by an aerial vehicle 200. Further aspects of the aerial vehicle 200 will be provided below.

The communication network 100 is divided into three geographical zones; a normal limitation zone 110; a coordination zone 120; and an exclusion zone 130. Each such zone is associated with its own set of restrictions regarding allowed transmission power levels, allowed frequency bands for communication, etc. Within the normal limitation zone 110 there are not any further restrictions than those commonly applied to a traditional cellular communication network. Within the co-ordination zone 120, transmissions within certain frequency bands are forbidden in order to avoid the risk of interference and/or blocking towards the receivers of the victim radio transceiver device 150. Within the exclusion zone 130 the same requirements as within the co-ordination zone 120 apply and in addition thereto, at least some aerial traffic is forbidden.

In FIG. 1 is further illustrated an aerial vehicle 200. In some examples the aerial vehicle 200 is an unmanned aerial vehicle (UAV), also known as a drone. According to a first example, the aerial vehicle 200 is operated autonomously without real-time connection to the cellular network. If the flight path of the aerial vehicle 200 is known, the flight path could be determined and programmed before flight takeoff. According to a second example, the aerial vehicle 200 is operated by being controlled over the cellular network. As an alternative, the aerial vehicle 200, if acting as a network access point, might have its own scheduler which can make decisions regarding the flight path during flight time.

As noted above there is still a need for an improved radio emission control of UAVs and other types of aerial vehicles 200.

Further in this respect, aerial vehicles 200, such as UAVs, are limited in size and weight and therefore possibilities for filtering aimed at reducing interference and/or blocking caused by a radio transceiver device of the aerial vehicle 200 are more limited than for ground based radio equipment.

Still further, the aerial vehicles 200 could use a frequency band that does not require any restrictions when the aerial vehicle 200 is located within the coordination zone or has less restrictive requirements in specification regarding out of band transmissions and spurious emissions. One issue here is the limitation of available frequency band for radio communication. This is especially true for the frequency bands below 1.8 GHz.

The embodiments disclosed herein therefore relate to an aerial vehicle 200 and mechanisms for controlling the aerial vehicle 200. In order to obtain such mechanisms there is provided an aerial vehicle 200, a controller 300, a method performed by the controller 300, a computer program product comprising code, for example in the form of a computer program, that when run on a controller 300, causes the controller 300 to perform the method.

Figure 2:
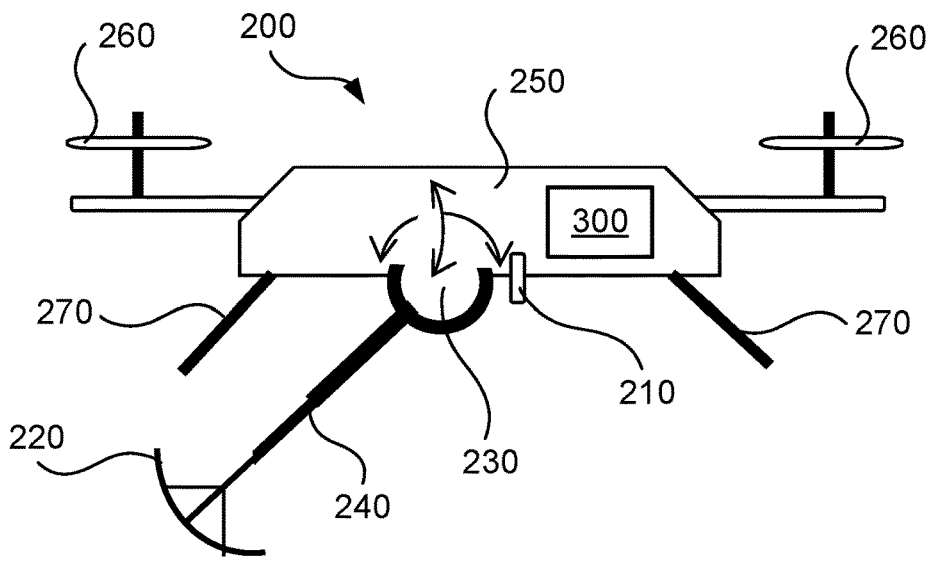
FIG. 2 schematically illustrates an aerial vehicle according to an embodiment.

Reference is now being made to FIG. 2 which schematically illustrates an aerial vehicle 200 according to an embodiment.

The aerial vehicle 200 comprises a radio transceiver device 210. The radio transceiver device 210 is configured for radio transmission in a set of radiation directions.

The aerial vehicle 200 further comprises a mechanical shield 220. The mechanical shield 220 positioned to reduce power of the radio transmission of the radio transceiver device 210 in at least some of the radiation directions in the set of radiation directions. In this respect, the aerial vehicle 200 might comprise either one single mechanical shield 220 or two or more such mechanical shields 220; the herein disclosed embodiments are not limited in this respect. However, for simplicity but without loss of generality, the aerial vehicle 200 will be described as having one mechanical shield 220.

The aerial vehicle 200 further comprises a controller 300. The controller 300 is configured to control at least one of: movement of the aerial vehicle 200, movement of the mechanical shield 220, radio communication of the aerial vehicle 200 via the radio transceiver device 210.

Further aspects of the aerial vehicle 200 will be disclosed hereinafter with continued references to FIG. 1 and FIG. 2.

There could be different types of radio transceiver devices 210. In some examples, the radio transceiver device 210 is part of: a user equipment, a network access point, a backhaul node, an integrated access and backhaul node, or a repeater node, as provided in the aerial vehicle 200. The aerial vehicle 200 might thereby act as either a user equipment or a network access point. When acting as a network access point, the aerial vehicle 200 might provided network access to another user equipment 160. As will be further disclosed below, the mechanical shield 220 might be movable relative to the antenna of the radio transceiver device 210. This also implies that in principle the antenna of the radio transceiver device 210 could be movable relative the mechanical shield 220. In yet further aspects, the antenna of the radio transceiver device 210 is movably mounted on the aerial vehicle 200. In yet further aspects, the radio transceiver device 210 comprises, or is operatively connected to, more than one antenna and the controller 300 is configured to selectively connect the radio transceiver device 210 to one or more of the antennas. Thereby, which one or more antenna is actually used for transmission (and/or reception) can be controlled by the controller 300 and this might also enable the power of the radio transmission of the radio transceiver device 210 to be reduced in at least some of the radiation directions in the set of radiation directions. Further in this respect, the receiver part of the radio transceiver device 210 might always be operatively connected to all the antennas of the radio transceiver device 210.

In further aspects, the controller 300 might be mounted in a body 250 of the aerial vehicle 200. The mechanical shield 220 might be attached to the body 250 by means of an arm 240 and a joint 230. The arm 240 might be a telescope arm and thus be extendable and retractable. The controller 300 might further be configured to extend and retract the arm 240. The joint 230 might be a ball joint or other type of joint. The joint 230 might be electrically controlled. The controller 300 might thereby control positioning of the mechanical shield 220 by interacting with the joint 230. The aerial vehicle 200 further comprises rotors 260 that are controlled by one or more motors (not shown) enabling the aerial vehicle 200 to fly. The one or more motors might be electrically controlled. The controller 300 might thereby control maneuvering of the aerial vehicle 200 by interacting with the one or more motors. According to the illustrative example of FIG. 2, the aerial vehicle 200 further comprises legs 270 for supporting the aerial vehicle 200 when located on ground.

Particular aspects relating to the mechanical shield 220 will now be disclosed.

According to the illustrative example of FIG. 2, the mechanical shield 220 is exterior to the radio transceiver device 210 in the aerial vehicle 200. That is, in some embodiments the mechanical shield 220 is positioned exterior to the radio transceiver device 210.

As disclosed above, the mechanical shield 220 positioned to reduce power of the radio transmission of the radio transceiver device 210. The mechanical shield 220 therefore reduces radio emission in those directions covered by the mechanical shield 220. That is, in some embodiments, the mechanical shield 220 is positioned to reduce power of the radio transmission in the radiation directions covered by the mechanical shield 220.

There could be different ways to mount the mechanical shield 220 in the aerial vehicle 200. In some aspects, the mechanical shield 220 is fixed at a static position relative to the aerial vehicle 200. That is, in some embodiments, the mechanical shield 220 is fixedly mounted in the aerial vehicle 200. The aerial vehicle 200 can then rotate its flying position or adjust the flight route where needed to fulfill emission requirements in the direction towards the victim radio transceiver device 150 during flight time. In other aspects the mechanical shield 220 is movable around the antenna of the radio transceiver device 210. That is, in some embodiments, the mechanical shield 220 is movably mounted in the aerial vehicle 200. Movement of the mechanical shield 220 might then be controlled by the controller 300. That is, the controller 300 might be configured to place the mechanical shield 220 in a certain position with respect to the antenna of the radio transceiver device 210, potentially also at a certain distance from the antenna of the radio transceiver device 210, etc. One purpose of adjusting the position of the mechanical shield 200 is to create different spatial radiation patterns of attenuated-radiation directions with respect to the direction towards the victim radio transceiver device 150.

If, for example, the attenuation is realized using a ground plane as the mechanical shield 220, then the mechanical shield 220 might be in the near-field electromagnetic field. That is, the radio transmission in the set of radiation directions might give rise to a near-field electromagnetic field and a far-field electromagnetic field, and in some embodiments the mechanical shield 220 is positioned to reduce power of the radio transmission in the near-field electromagnetic field. Alternatively, in some cases, the mechanical shield 220 might need to be placed further towards the far-field electromagnetic field, depending on the design of the mechanical shield 220, the intended radiation pattern of the radio transceiver device 210, and the physical restrictions of the aerial vehicle 200. That is, in some embodiments, the mechanical shield 220 is positioned to reduce power of the radio transmission in the far-field electromagnetic field.

There could be different materials of the mechanical shield 220. In some embodiments, the mechanical shield 220 is made of a radio emission absorbing material. The mechanical shield 220 could thus be constructed from absorbing materials. In this respect, the mechanical shield 220 could be constructed from sheet metal, a metal screen, and/or a metal foam. Any holes in the mechanical shield 220 are significantly smaller than the wavelength of the radiation that is intended to be reduced (i.e., to reduce power of the radio transmission of the radio transceiver device 210). Further, the mechanical shield 220 might comprise a ground plane. Apart from attenuating radiation in the direction of the victim radio transceiver device 150, the mechanical shield 220 might be constructed to increase the radiation of the radio transceiver device 210 in the wanted direction (i.e. to create a directional radiation pattern), and thus act as a directional antenna. Alternatively, the mechanical shield 220 might reduce radiation in unwanted directions only. In some embodiments, the mechanical shield 220 is provided with a radio frequency selective surface, and the mechanical shield 220 is positioned for the radio frequency selective surface to face the radio transceiver device 210. In this respect, frequency selective surfaces, such as resonators, wavetraps, high-impedance surfaces, might be mounted on the aerial vehicle 200. The position of the frequency selective surfaces with respect to the antenna of the radio transceiver device 210 could be adjustable. One reason for having a frequency selective structure is to attenuate the radiated signal from the antenna of the radio transceiver device 210 at frequencies that would cause interference towards the victim radio transceiver device 150 whilst avoiding as far as possible attenuation of the signal transmitted in the operating frequency band of the aerial vehicle 200.

Combinations of the above-disclosed embodiments are possible.

Particular aspects relating to how the controller 300 might be configured to reduce the impact of the transmission from the radio transceiver device 210 towards the victim radio transceiver device 150 will now be disclosed.

In some aspects, the controller 300 is configured to reduce the impact by determining how to orient the mechanical shield 220 (for example with respect to the absolute position of the aerial vehicle 200, the direction towards, or location of, the victim radio transceiver device 150, and/or the elevation of the aerial vehicle 200). That is, some embodiments, the controller 300 is configured to determine how to orient the mechanical shield 220 upon obtaining an indication that the power of the radio transmission needs to be reduced in at least some of the radiation directions in the set of radiation directions. Upon having obtained the indication, the controller 300 might then orient the mechanical shield 220 accordingly. There could be different ways for the controller 300 to obtain this indication. In some aspects, and as will be disclosed below the indication is an internal indication of the aerial vehicle 200 whilst in other aspects the indication is an external indication with respect to the aerial vehicle 200.

In some aspects, the controller 300 is configured to reduce the impact by reducing the radio transmission towards the victim radio transceiver device 150. That is, in some embodiments, the radio transmission is to be reduced towards a victim radio transceiver device 150, and the mechanical shield 220 is positioned in a direction from the radio transceiver device 210 towards the victim radio transceiver device 150. If this is not the case, the controller 300 might then orient the mechanical shield 220 accordingly.

There could be different ways for the controller 300 to determine the direction towards the victim radio transceiver device 150.

In some aspects the controller 300 uses information about the relative positions of the aerial vehicle 200 and the victim radio transceiver device 150 to determine the direction towards the victim radio transceiver device 150. That is, in some embodiments, how to place the mechanical shield 220 is based on information of relative positions of the aerial vehicle 200 and the victim radio transceiver device 150. Information of the relative positions of the aerial vehicle 200 and the victim radio transceiver device 150 might be obtained e.g. from a database.

In some aspects the controller 300 uses measurements to determine the direction towards the victim radio transceiver device 150. That is, in some embodiments, how to place the mechanical shield 220 is based on measurements obtained by the controller 300. The measurements might either be performed by the aerial vehicle 200 itself or be made available to the controller 300, for example from a network access point 140. The measurements could, for example, be based on cellular network signals, or geographical positioning signals, or barometric pressure signals.

In some aspects the controller 300 uses signalling to determine the direction towards the victim radio transceiver device 150. That is, in some embodiments, in which direction to place the mechanical shield 220 is based on signalling from the victim radio transceiver device 150 or from a network access point 140.

Particular aspects relating to how the controller 300 might be configured to determine whether or not the aerial vehicle 200 should take any action to avoid, or at least reduce, interference and/or blocking in the direction towards the victim radio transceiver device 150 will now be disclosed. Examples of such actions will be disclosed further below.

In some embodiments, the controller 300 is configured to determine whether the mechanical shield 220 is to be placed in a given position or not upon obtaining an indication that the power of the radio transmission needs to be reduced in at least some of the radiation directions in the set of radiation directions. In some embodiments, this given position corresponds to that the mechanical shield 220 is positioned in the direction from the radio transceiver device 210 towards the victim radio transceiver device 150.

In some aspects the controller 300 is configured to determine whether or not the aerial vehicle 200 should take any action based on information of relative positions of the aerial vehicle 200 and the victim radio transceiver device 150. That is, in some embodiments, whether the mechanical shield 220 is to be placed in this given position or not depends on information of relative positions of the aerial vehicle 200 and the victim radio transceiver device 150.

In some aspects the controller 300 is configured to determine whether or not the aerial vehicle 200 should take any action based on the elevation of the aerial vehicle 200. That is, in some embodiments, whether the mechanical shield 220 is to be placed in this given position or not depends on the vertical distance between the aerial vehicle 200 and ground. Instead of the vertical distance between the aerial vehicle 200 and ground, the difference in vertical distance between the aerial vehicle 200 and the victim radio transceiver device 150 can be used.

In some aspects the controller 300 is configured to determine whether or not the aerial vehicle 200 should take any action based on measurements. That is, in some embodiments, whether the mechanical shield 220 is to be placed in this given position or not depends on measurements obtained by the controller 300. The measurements might be performed by the radio transceiver device 210 itself and then be provided to the controller 300 or be performed by one of the network access points 140 and then be provided to the controller 300 via the radio transceiver device 210. In yet further examples the measurements are performed by the victim radio transceiver device 150 and then provided to the aerial vehicle 200. In this respect, a network access point 140 either within or outside the coordination zone may signal to the aerial vehicle 200 that the radio transceiver device 210 needs to lower transmission power. The controller 300 might use such signalling to trigger placement of the mechanical shield 220 in a given position.

In some aspects the controller 300 is configured to determine whether or not the aerial vehicle 200 should take any action based on information of the victim radio transceiver device 150. That is, in some embodiments, whether the mechanical shield 220 is to be placed in the given position or not depends on information pertaining to the victim radio transceiver device 150. Such information might pertain to during which hours of the victim radio transceiver device 150 is operating, other pieces of information pertaining to the activity level of the victim radio transceiver device 150, and/or information specifying the geographical location of the victim radio transceiver device 150. Such information might indicate to the controller 300 as to when in time the mechanical shield 220 needs to be enabled and/or at which geographical location the mechanical shield 220 is to be placed. Having determined the direction towards the victim radio transceiver device 150 and that an action is needed to reduce interference towards the victim radio transceiver device 150, the mechanical shield 220 may thus be placed accordingly.

Since the radiation is by the mechanical shield 220 only attenuated in certain directions, it might be necessary to further adjust the way in which transmissions to/from the radio transceiver device 210 of the aerial vehicle 200 is handled. Such adjustment might, for example, pertain to which network access point 140 is serving the radio transceiver device 210 of the aerial vehicle 200, and mobility procedures performed by the radio transceiver device 210 of the aerial vehicle 200. That is, in some embodiments, the controller 300 is configured to instruct the radio transceiver device 210 to perform at least one network-related action upon obtaining an indication that the power of the radio transmission needs to be reduced in at least some of the radiation directions in the set of radiation directions.

Examples of network-related actions will be provided next.

According to a first example, the radio transceiver device 210 is forced even before reaching the coordination zone to be subjected to handover and thus establish an operative connection to a new network access point 140 for continued network service.

According to a second example, the radio transceiver device 210 is operatively connected to different network access points 140 in the transmit direction and in the receive direction, respectively, so that transmission in the direction towards the victim radio transceiver device 150 is avoided whilst reception remains to be from the network access point 140 with highest power or quality (such as highest RSRP or RSRQ). This can be achieved by mechanisms such as dual connectivity (DC) connections. Further, in case time division duplexing (TDD) is used, attenuation by the mechanical shield 220 needs only to be enabled when transmission from the radio transceiver device 210 is enabled such that attenuation caused by the mechanical shield 220 is synchronized with the transmission periods of the radio transceiver device.

According to a third example, the radio transceiver device 210 reduces its transmit power based on the distance between itself and the victim radio transceiver device 150. The attenuation of the transmit power might further be dependent on the actual vertical distance to ground, or elevation, of the aerial vehicle 200, and/or the relative vertical distance between the aerial vehicle 200 and the victim radio transceiver device 150. For example, when placed on the ground, the aerial vehicle 200 might act as a regular UE.

According to a fourth example, the radio transceiver device 210 adjusts its use of physical resource blocks or frequency carriers within its transmission bandwidth such that interference and harmonics do not fall into the receive frequency band of the victim radio transceiver device 150.

According to a fifth example, the frequency carrier or frequency band used for communication with the radio transceiver device 210 is changed.

In some examples the at least one network-related action thus pertains to any of: switch a network connection of the radio transceiver device 210 from one network access point 140 to another network access point 140; operatively connect the radio transceiver device 210 to one network access point 140 in transmit direction and another network access point 140 in receive direction; reduce transmission power of the radio transmission; adjust use of physical resource blocks and/or carriers within a transmission bandwidth used by the radio transceiver device 210 for the radio transmission; adjust carrier frequency and/or frequency band used by the radio transceiver device 210 for the radio transmission.

The aerial vehicle 200 might further be instructed by the controller 300 to adjust the flight height in order to change the condition for the mechanical shield 220 and the radiation towards the victim radio transceiver device 150. That is, in some embodiments, the controller 300 is configured to instruct the aerial vehicle to adjust its vertical distance to ground upon obtaining an indication that the power of the radio transmission needs to be reduced in at least some of the radiation directions in the set of radiation directions.

Figure 3:
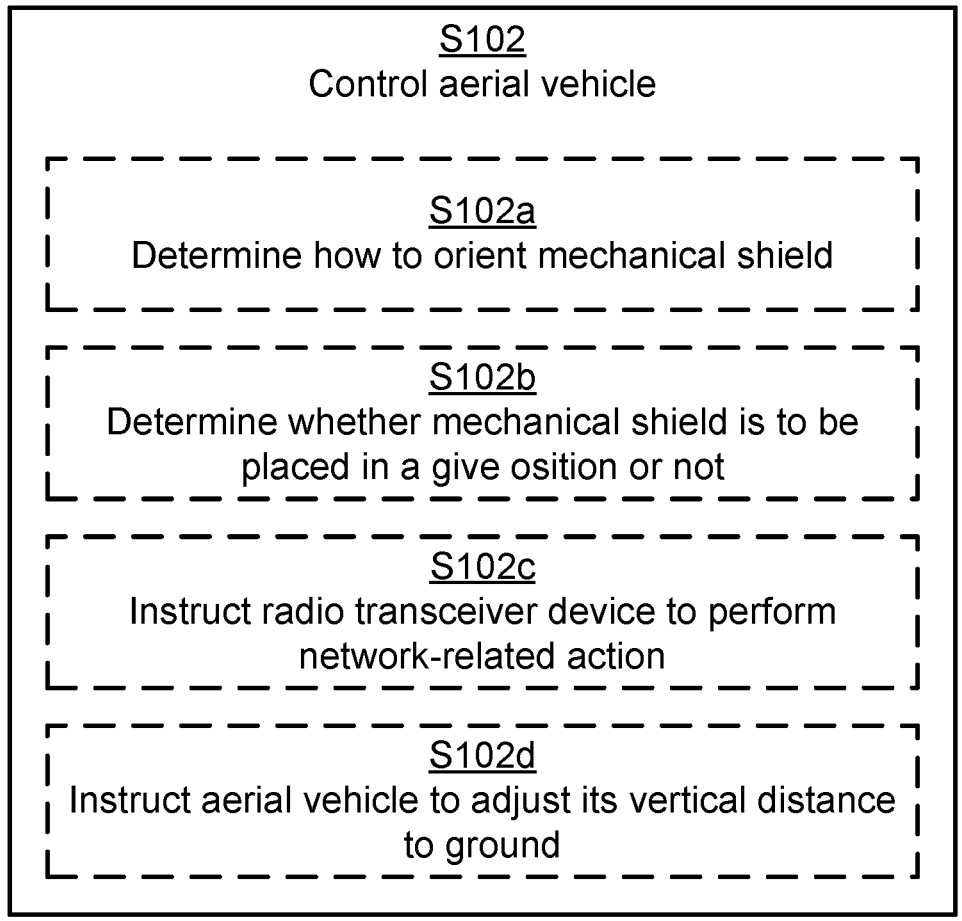
FIGS. 3 and 4 are flowcharts of methods according to embodiments.

FIG. 3 is a flowchart illustrating embodiments of methods for controlling an aerial vehicle 200 as disclosed above. The methods are performed by the controller 300. The methods are advantageously provided as computer programs 720.

S102: The controller 300 controls at least one of: movement of the aerial vehicle 200, movement of the mechanical shield 220, radio communication of the aerial vehicle 200 via the radio transceiver device 210.

Embodiments relating to further details of controlling an aerial vehicle 200 as performed by the controller 300 will now be disclosed.

As disclosed above, the controller 300 might determine how to orient the mechanical shield 220. That is in some embodiment, the controller 300 is configured to perform (optional) action S102a as part of the control in action S102:

S102a: The controller 300 determines how to orient the mechanical shield 220 upon obtaining an indication that the power of the radio transmission needs to be reduced in at least some of the radiation directions in the set of radiation directions. The controller 300 then initiates movement of the mechanical shield 220 accordingly.

As disclosed above, the controller 300 might determine whether the mechanical shield 220 is to be placed in a given position or not. That is in some embodiment, the controller 300 is configured to perform (optional) action S102b as part of the control in action S102:

S102b: The controller 300 determines whether the mechanical shield 220 is to be placed in a given position or not upon obtaining an indication that the power of the radio transmission needs to be reduced in at least some of the radiation directions in the set of radiation directions. The controller 300 then initiates movement of the mechanical shield 220 accordingly.

As disclosed above, the controller 300 might instruct the radio transceiver device 210 to perform at least one network-related action. That is in some embodiment, the controller 300 is configured to perform (optional) action S102c as part of the control in action S102:

S102c: The controller 300 instructs the radio transceiver device 210 to perform at least one network-related action upon obtaining an indication that the power of the radio transmission needs to be reduced in at least some of the radiation directions in the set of radiation directions.

As disclosed above, the controller 300 might instruct the aerial vehicle 200 to adjust its vertical distance to ground. That is in some embodiment, the controller 300 is configured to perform (optional) action S102c as part of the control in action S102:

S102c: The controller 300 instructs the aerial vehicle 200 to adjust its vertical distance to ground upon obtaining an indication that the power of the radio transmission needs to be reduced in at least some of the radiation directions in the set of radiation directions.

Figure 4:
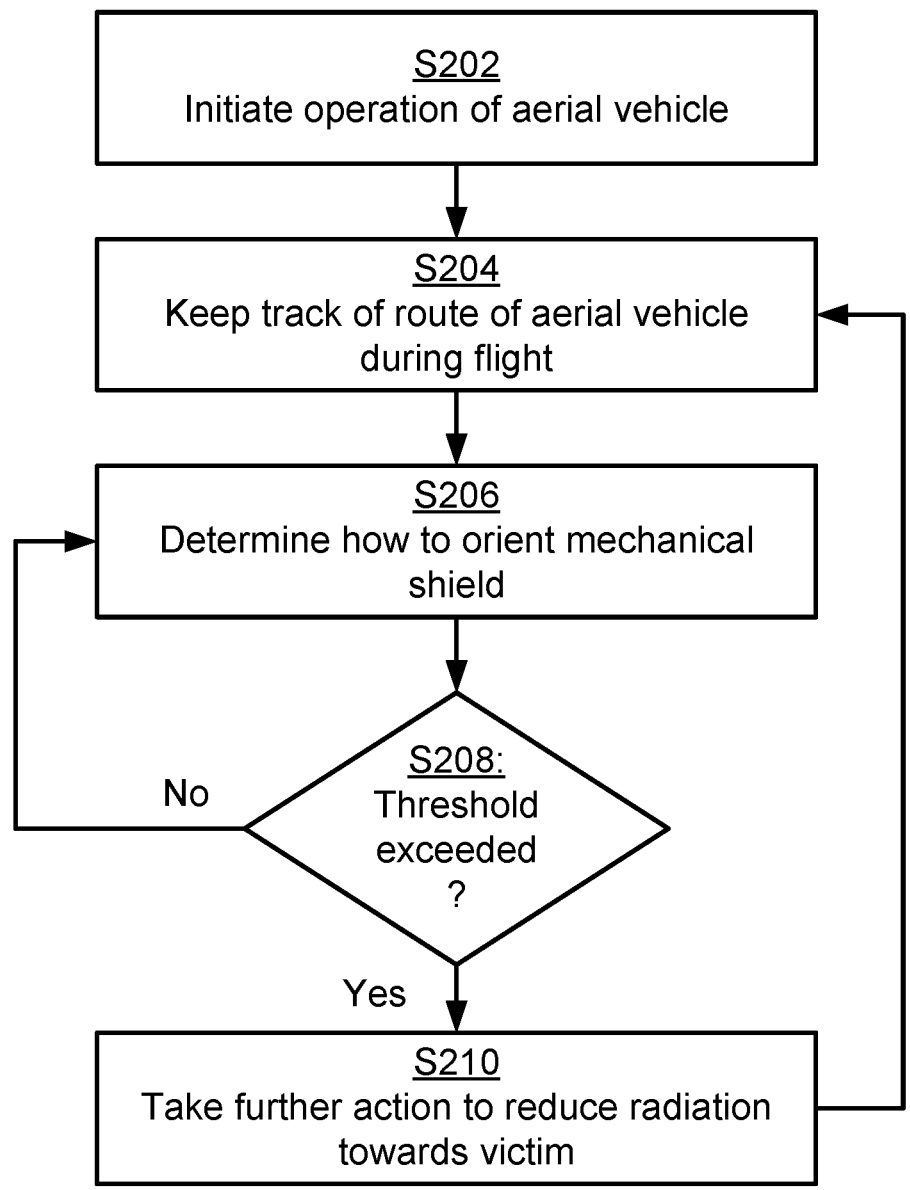

FIG. 4 is a flowchart illustrating one particular embodiment of a method for controlling an aerial vehicle 200 based on at least some of the above disclosed embodiments.

S202: Operation of the aerial vehicle 200 is initiated. In this respect, the aerial vehicle 200 is certified for operating in specific frequency bands and is provided with a mechanical shield 220 to avoid radio transmission, or emission, in certain direction(s). The controller 300 is aware of the radiation pattern of the antennas of the radio transceiver device 210 and is configured to adjust the radiation by placing the mechanical shield 220 in a certain position. The aerial vehicle 200 might be calibrated and certified before takeoff to follow license requirements, which may add additional restrictions in some areas.

S204: The route of the aerial vehicle 200 is kept track of during flight. In this respect, the location of the aerial vehicle 200 is kept track of either by the controller 300 or by one or more of the network access points 140. Either the controller 300 or one or more of the network access points 140 has access to a database of victim radio transceiver devices 150 which need protection, and/or coordination zones for these victim radio transceiver devices 150, and/or exclusion zones for these victim radio transceiver devices 150. Either the controller 300 or one or more of the network access points 140 might track the activity level of these victim radio transceiver devices 150 that need protection and/or other factors, such as time of day etc.

S206: The controller 300 determines how to orient the mechanical shield 220 to reduce radiation, or emission, of the radio transmission device 210 in the direction towards the victim radio transceiver devices 150. In this respect, if the aerial vehicle 200 comes close to a victim radio transceiver device 150 or a coordination zone and the controller 300 or one or more of the network access points 140 determines that transmission from the radio transceiver device 210 of the aerial vehicle 200 might cause harmful interference and/or blocking, radiation in that or those direction(s) can be limited by means of placing the mechanical shield 220 appropriately.

S208: It is checked whether the radiation, or emission, of the radio transmission device 210 in the direction towards the victim radio transceiver devices 150 exceeds a threshold value, such as a maximum interference threshold. If no, action S206 is entered again. If yes, action S210 is entered.

S210: The controller 300 takes a further action to further reduce the radiation, or emission, of the radio transmission device 210 in the direction towards the victim radio transceiver devices 150. In this respect, if the threshold value is determined to still be exceeded, then the controller 300 needs to take a further action, for example to instruct the aerial vehicle 200 to maintain sufficient flight distance to the victim radio transceiver device 150, or change the direction of the transmission from the radio transceiver device 210 to another direction, for example by performing a handover, or instruct the radio transceiver device 210 to change its operating frequency.

Figure 5:
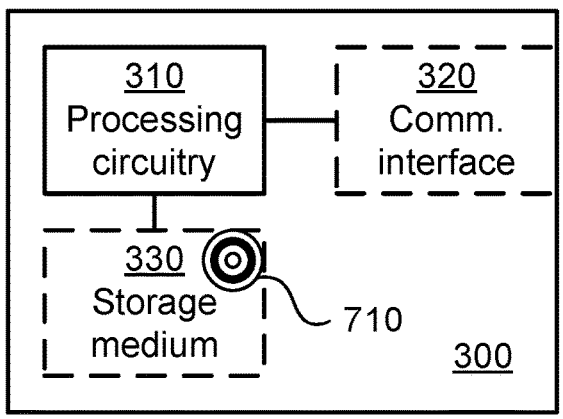
FIG. 5 is a schematic diagram showing functional units of a controller according to an embodiment.

FIG. 5 schematically illustrates, in terms of a number of functional units, the components of a controller 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 330. The processing circuitry 310 may further be provided as at least one application specific integrated circuit (ASIC), or field programmable gate array (FPGA).

Particularly, the processing circuitry 310 is configured to cause the controller 300 to perform a set of operations, or steps, as disclosed above. For example, the storage medium 330 may store the set of operations, and the processing circuitry 310 may be configured to retrieve the set of operations from the storage medium 330 to cause the controller 300 to perform the set of operations. The set of operations may be provided as a set of executable instructions.

Thus the processing circuitry 310 is thereby arranged to execute methods as herein disclosed. The storage medium 330 may also comprise persistent storage, which, for example, can be any single one or combination of magnetic memory, optical memory, solid state memory or even remotely mounted memory. The controller 300 may further comprise a communications interface 320 at least configured for communications with other components of the aerial vehicle 200, such as the mechanical shield 220 and the radio transceiver device 210. As such the communications interface 320 may comprise one or more transmitters and receivers, comprising analogue and digital components. The processing circuitry 310 controls the general operation of the controller 300 e.g. by sending data and control signals to the communications interface 320 and the storage medium 330, by receiving data and reports from the communications interface 320, and by retrieving data and instructions from the storage medium 330. Other components, as well as the related functionality, of the controller 300 are omitted in order not to obscure the concepts presented herein.

Figure 6:
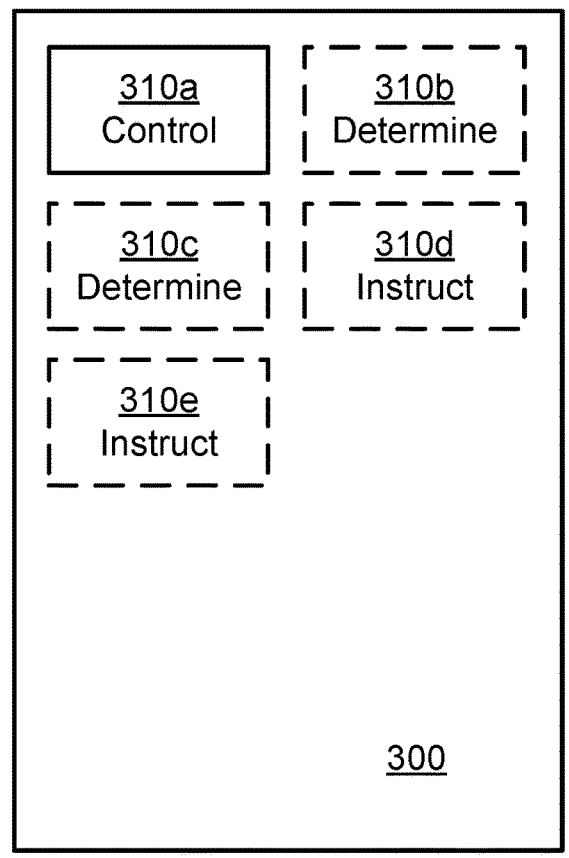
FIG. 6 is a schematic diagram showing functional modules of a controller according to an embodiment.

FIG. 6 schematically illustrates, in terms of a number of functional modules, the components of a controller 300 according to an embodiment. The controller 300 of FIG. 6 comprises a control module 310a configured to perform action S102. The controller 300 of FIG. 6 may further comprise a number of optional functional modules, such as any of a determine module 310b configured to perform action S102a, a determine module 310c configured to perform action S102b, an instruct module 310d configured to perform action S102c, and an instruct module 310e configured to perform action S102d. In general terms, each functional module 310a-310e may in one embodiment be implemented only in hardware and in another embodiment with the help of software, i.e., the latter embodiment having computer program instructions stored on the storage medium 330 which when run on the processing circuitry makes the controller 300 perform the corresponding actions mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 310a-310e may be implemented by the processing circuitry 310, possibly in cooperation with the communications interface 320 and/or the storage medium 330. The processing circuitry 310 may thus be configured to from the storage medium 330 fetch instructions as provided by a functional module 310a-310e and to execute these instructions, thereby performing any actions as disclosed herein.

The controller 300 may be provided as a standalone device or as a part of at least one further device. For example, the controller 300 may be integrated with, part of, or collocated with, other circuitry of the aerial vehicle 200. Further, a first portion of the instructions performed by the controller 300 may be executed in a first device, and a second portion of the of the instructions performed by the controller 300 may be executed in a second device; the herein disclosed embodiments are not limited to any particular number of devices on which the instructions performed by the controller 300 may be executed. Hence, the methods according to the herein disclosed embodiments are suitable to be performed by a controller 300 residing in a cloud computational environment. Therefore, although a single processing circuitry 310 is illustrated in FIG. 5 the processing circuitry 310 may be distributed among a plurality of devices, or nodes. The same applies to the functional modules 310a-310e of FIG. 6 and the computer program 720 of FIG. 7.

Figure 7:
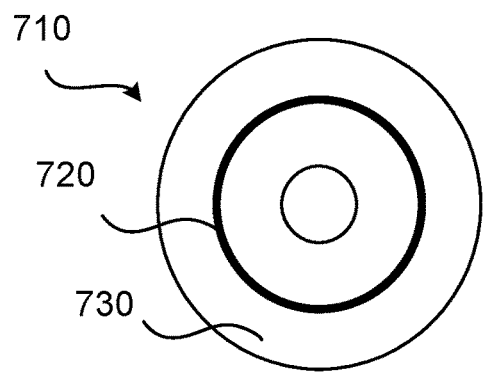
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 310 and thereto operatively coupled entities and devices, such as the communications interface 320 and the storage medium 330, to execute methods according to embodiments described herein. The computer program 720 and/or computer program product 710 may thus provide means for performing any actions as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. An aerial vehicle, the aerial vehicle comprising:
a radio transceiver configured for radio transmission in a set of radiation directions;
a mechanical shield positioned to reduce power of the radio transmission in at least some of the radiation directions in the set of radiation directions; and
a controller configured to:
determine how to orient the mechanical shield upon obtaining an indication that the power of the radio transmission needs to be reduced in at least some of the radiation directions in the set of radiation directions; and
control, based on the determining, at least one of: movement of the aerial vehicle, movement of the mechanical shield, and radio communication of the aerial vehicle via the radio transceiver device.

2. The aerial vehicle according to claim 1, wherein the radio transmission is to be reduced towards a victim radio transceiver device, and wherein the mechanical shield is positioned in a direction from the radio transceiver device towards the victim radio transceiver device.

3. The aerial vehicle according to claim 2, wherein one of:
how to place the mechanical shield is based on information of relative positions of the aerial vehicle and the victim radio transceiver device;
how to place the mechanical shield is based on measurements obtained by the controller and
in which direction to place the mechanical shield is based on signalling from the victim radio transceiver device or from a network access point.

4. The aerial vehicle according to claim 3, wherein the controller is configured to determine whether the mechanical shield is to be placed in a given position or not upon obtaining an indication that the power of the radio transmission needs to be reduced in at least some of the radiation directions in the set of radiation directions.

5. The aerial vehicle according claim 4, wherein said given position corresponds to that the mechanical shield is positioned in the direction from the radio transceiver device towards the victim radio transceiver device.

6. The aerial vehicle according to claim 4, wherein whether the mechanical shield is to be placed in said given position or not depends on information of relative positions of the aerial vehicle and the victim radio transceiver device.

7. The aerial vehicle according to claim 4, wherein whether the mechanical shield is to be placed in said given position or not depends on vertical distance between the aerial vehicle and ground.

8. The aerial vehicle according to claim 4, wherein whether the mechanical shield is to be placed in said given position or not depends on measurements obtained by the controller.

9. The aerial vehicle according to claim 4, wherein whether the mechanical shield is to be placed in said given position or not depends on information pertaining to the victim radio transceiver device.

10. The aerial vehicle according to claim 1, wherein the controller is configured to instruct the radio transceiver device to perform at least one network-related action upon obtaining an indication that the power of the radio transmission needs to be reduced in a plurality of the radiation directions in the set of radiation directions.

11. The aerial vehicle according to claim 10, wherein the at least one network-related action pertains to any of:
switch a network connection of the radio transceiver device from one network access point to another network access point;
operatively connect the radio transceiver device to one network access point in transmit direction and another network access point in receive direction;
reduce transmission power of the radio transmission;
adjust use of at least one of physical resource blocks and carriers within a transmission bandwidth used by the radio transceiver device for the radio transmission; and
adjust at least one of carrier frequency and frequency band used by the radio transceiver device for the radio transmission.

12. The aerial vehicle according to claim 1, wherein the controller is configured to instruct the aerial vehicle to adjust its vertical distance to ground upon obtaining an indication that the power of the radio transmission needs to be reduced in at least some of the radiation directions in the set of radiation directions.

13. The aerial vehicle according to claim 1, wherein one of: the mechanical shield is positioned exterior to the radio transceiver device:
the mechanical shield is positioned to reduce power of the radio transmission in the radiation directions covered by the mechanical shield;
the mechanical shield is fixedly mounted in the aerial vehicle; and
the mechanical shield is movably mounted in the aerial vehicle, and wherein movement of the mechanical shield is controlled by the controller.

14. The aerial vehicle according to claim 1, wherein the radio transmission in the set of radiation directions gives rise to a near-field electromagnetic field and a far-field electromagnetic field, and wherein the mechanical shield is positioned to reduce power of the radio transmission in the near-field electromagnetic field.

15. The aerial vehicle according to claim 1, wherein the radio transmission in the set of radiation directions gives rise to a near-field electromagnetic field and a far-field electromagnetic field, and wherein the mechanical shield is positioned to reduce power of the radio transmission in the far-field electromagnetic field.

16. The aerial vehicle according to claim 1, wherein the radio transceiver device is part of: a user equipment, a network access point, a backhaul node, an integrated access and backhaul node, or a repeater node, as provided in the aerial vehicle.

17. A method for controlling an aerial vehicle, the arial vehicle having a radio transceiver device configured for radio transmission in a set of radiation directions, a mechanical shield positioned to reduce power of the radio transmission in at least some of the radiation directions in the set of radiation directions, and a controller, the method comprising:
determining how to orient the mechanical shield upon obtaining an indication that the power of the radio transmission needs to be reduced in at least some of the radiation directions in the set of radiation directions; and
controlling, using the controller and based on the determining, at least one of: movement of the aerial vehicle, movement of the mechanical shield, and radio communication of the aerial vehicle via the radio transceiver device.

18. A controller for controlling an aerial vehicle, the arial vehicle having a radio transceiver device configured for radio transmission in a set of radiation directions, a mechanical shield positioned to reduce power of the radio transmission in at least some of the radiation directions in the set of radiation directions, and a controller, the controller comprising processing circuitry, the processing circuitry being configured to cause the controller to:
determine how to orient the mechanical shield upon obtaining an indication that the power of the radio transmission needs to be reduced in at least some of the radiation directions in the set of radiation directions; and
control, based on the determining, at least one of: movement of the aerial vehicle, movement of the mechanical shield, and radio communication of the aerial vehicle via the radio transceiver device.

19. A computer storage medium storing a computer program for controlling an aerial vehicle, the arial vehicle having a radio transceiver device configured for radio transmission in a set of radiation directions, a mechanical shield positioned to reduce power of the radio transmission in at least some of the radiation directions in the set of radiation directions, and a controller, the computer program comprising computer code which, when run on processing circuitry of the controller, causes the controller to:
determine how to orient the mechanical shield upon obtaining an indication that the power of the radio transmission needs to be reduced in at least some of the radiation directions in the set of radiation directions; and
control, based on the determining, at least one of: movement of the aerial vehicle, movement of the mechanical shield, and radio communication of the aerial vehicle via the radio transceiver device.

* * * * *

UNITED STATES PATENT AND TRADEMARK OFFICE
CERTIFICATE OF CORRECTION

| | | |
|---|---|---|
| PATENT NO. | : 12,148,989 B2 | Page 1 of 1 |
| APPLICATION NO. | : 17/918483 | |
| DATED | : November 19, 2024 | |
| INVENTOR(S) | : Schuh et al. | |

It is certified that error appears in the above-identified patent and that said Letters Patent is hereby corrected as shown below:

In the Specification

In Column 1, Line 38, delete "relates" and insert -- relates to --, therefor.

In Column 2, Line 4, delete "interfere" and insert -- interfere with --, therefor.

In Column 5, Line 29, delete "relative" and insert -- relative to --, therefor.

In Column 5, Line 59, delete "maneuvering" and insert -- manoeuvring --, therefor.

In Column 8, Line 24, delete "that the" and insert -- the --, therefor.

In Column 12, Line 63, delete "or all" and insert -- of all --, therefor.

In Column 13, Line 10, delete "of the of the" and insert -- of the --, therefor.

In the Claims

In Column 14, Line 15, in Claim 3, delete "controller and" and insert -- controller; and --, therefor.

In Column 14, Line 25, in Claim 5, delete "according" and insert -- according to --, therefor.

In Column 15, Line 33, in Claim 17, delete "arial" and insert -- aerial --, therefor.

In Column 16, Line 7, in Claim 18, delete "arial" and insert -- aerial --, therefor.

In Column 16, Line 26, in Claim 19, delete "arial" and insert -- aerial --, therefor.

Signed and Sealed this
Seventh Day of October, 2025

John A. Squires
*Director of the United States Patent and Trademark Office*